United States Patent [19]
Everett

[11] Patent Number: 4,458,671
[45] Date of Patent: Jul. 10, 1984

[54] SOLAR HEATING DEVICE

[76] Inventor: Paul T. Everett, 828 E. Boone St., Santa Maria, Calif. 93454

[21] Appl. No.: 406,130

[22] Filed: Aug. 9, 1982

[51] Int. Cl.³ .............................................. F24J 3/02
[52] U.S. Cl. .................................. 126/437; 126/450
[58] Field of Search ............... 126/450, 449, 437, 448

[56] References Cited
U.S. PATENT DOCUMENTS

| | | | |
|---|---|---|---|
| 2,202,756 | 5/1940 | Cline | 126/434 |
| 4,086,910 | 5/1978 | Futch | 126/437 |
| 4,184,481 | 1/1980 | Turnquist | 126/450 |

Primary Examiner—Samuel Scott
Assistant Examiner—G. Anderson
Attorney, Agent, or Firm—Roger A. Marrs

[57] ABSTRACT

A stationary solar heating device is disclosed herein for heating water usable for domestic or industrial purposes which provides a solar ray collector assembly having a conical shell retained on a supporting base having a conical arrangement of tubular coils carried on the exterior surface thereof. The coils are characterized as having a generally circular cross section with a flat mounting side adjacent to the conical shell for maximum thermal transference to a circulating fluid carried by the coils. A transparent or light permeable protective shield encloses the entire collector assembly and opposite ends of the tubular coil at the base and the apex respectively serve as fluid input and output conduits. An air relief valve is operably coupled into the topmost coil of the assembly and the interior of the shell is substantially insulated to preserve heat in the shell and in the fluid carried by the tubular coils. An anchoring system is provided for coupling the protective shield and the collector assembly together into a unitary construction and which includes a cable tie-down arrangement for securing the complete solar heating device in a stationary, non-movable manner to a roof or ground foundation.

4 Claims, 4 Drawing Figures

U.S. Patent    Jul. 10, 1984    4,458,671
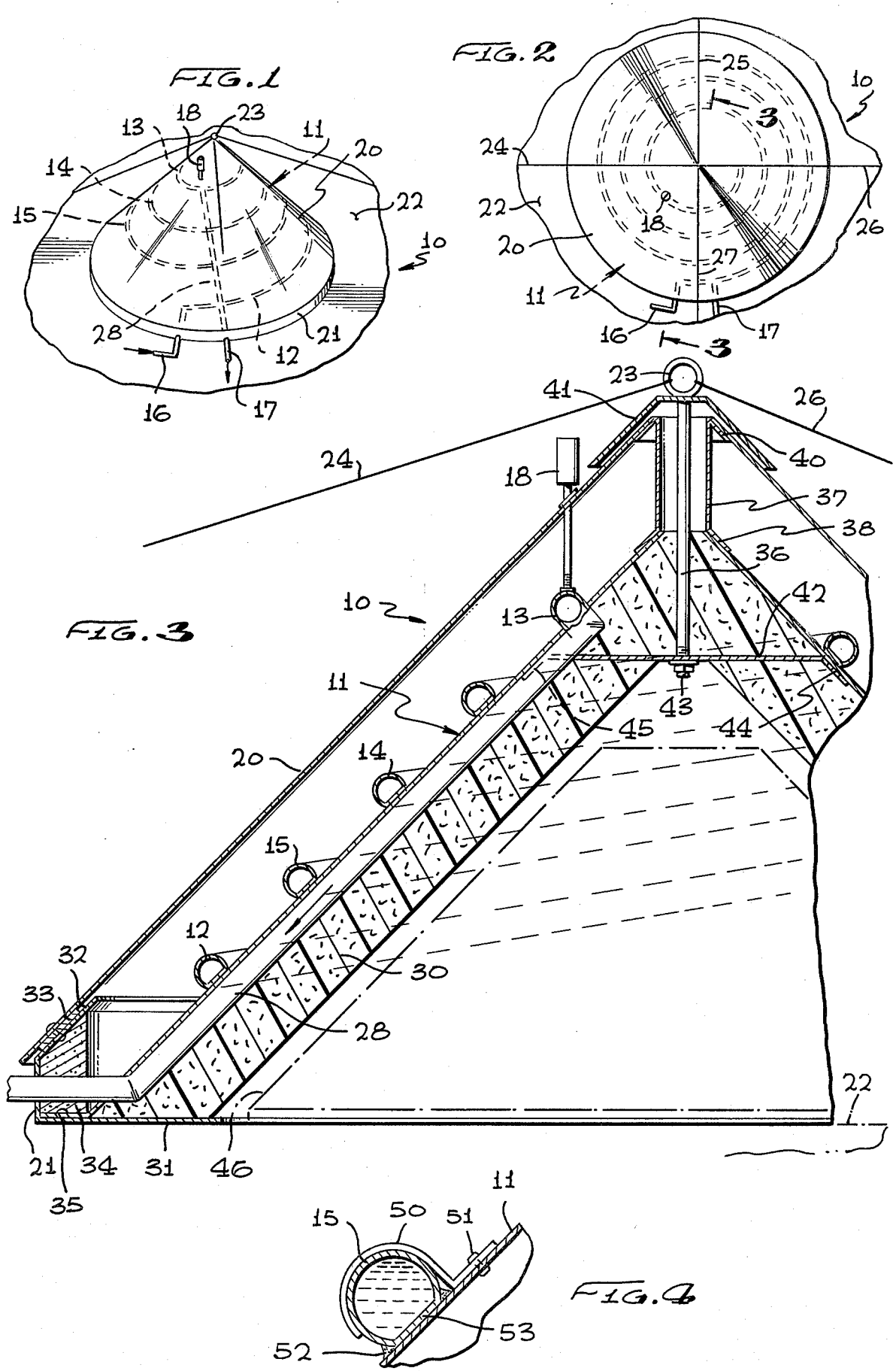

SOLAR HEATING DEVICE

BACKGROUND OF THE INVENTION

1. Field of the Invention

The present invention relates to the field of solar heaters for elevating the temperature of water and more particularly, to a novel solar heating apparatus having increased sun ray gathering or collecting capabilities inherently derived from the novel shape and construction thereof.

2. Brief Description of the Prior Art

Conventional solar heaters have been used for providing an increase in the temperature of water for household use. Such previous heater assemblies generally employ solar collectors which are flat so that only one side of the collector is exposed to the sun's radiation so that solar collecting capability is very inefficient. Generally, no means are provided for exposing the opposite side of the collector to the sun's radiation at the same time that the first or top side is exposed. Therefore, great inefficiencies are encountered with the systems since only one half or a minor portion of the collector is exposed to the sun's radiation at a given time.

Although some attempts have been made to remedy this problem by incorporating motors and other movements for tracking the position of the sun with respect to the flat side of the solar collector, these systems are still inefficient since they require an additional source of power for operating the motor movements and require a complex mounting arrangement so that the collector may be movable thereon. Such construction adds to weight that further requires a substantial foundation or support to be provided on the roof of a dwelling or a building which, in turn, unduly stresses the construction of the building.

Additional attempts have been made to compensate for the movement of the sun during its daily travel about the earth which takes the form of providing a multi-sided solar collector having a multiplicity of flat surfaces which take one of several geometric forms such as a pentagonal shape when viewed from above. However, inefficient solar collection is still encountered due to the fact that only a portion of the total available collector surface is exposed to the sun at a given time. Therefore, inefficiencies in heat transfer are encountered when then sun's rays are less than perpendicular or ninety degrees to the flat collector whether the entire collector is flat or a portion thereof is flat.

In view of the foregoing, it can be seen that a long standing need has existed to provide a novel solar heating apparatus which includes a stationary or non-moving solar collector which will substantially maintain the collector surfaces perpendicular respective to the sun's radiation and to provide a non-linear solar ray collector which exposes maximum surface area to the sun's radiation.

SUMMARY OF THE INVENTION

Accordingly, the above problems and difficulties are obviated by the present invention which provides a solar ray collector assembly incorporating a conical shell supporting a plurality of tubular coils in a coaxial relationship about the exterior surface of the shell. Base means are provided for supporting the shell and coils and a protective, light transparent or translucent shield covers the solar ray collector assembly in a coaxial manner. Inlet and outlet means are provided on opposite ends of the coil assembly for conducting a fluid through the plurality of coils and an air release means is provided on the uppermost coil of the plurality. Anchoring means are included for coupling the protective shield to the solar ray collector assembly in fixed spaced relationship and a cable tie-down arrangement is employed for securing the complete solar heating device in a stationary, non-movable manner to a roof or ground foundation.

Therefore, it is among the primary objects of the present invention to provide a novel solar heating apparatus typical of efficient operation regardless of the sun's position as it progresses through its daily path of travel.

Another object of the present invention is to provide a novel solar heating unit which is conical so as to present solar ray collection surface to the path of oncoming solar rays in an efficient manner during the sun's travel.

Yet another object of the present invention is to provide a novel solar heating apparatus that may be readily mounted on a roof or ground area without incorporating heavy supports, articulating movements, motors or the like.

Another object of the present invention is to provide a novel stationary solar heating device usable for heating water or other fluids which incorporates improved solar ray gathering capabilities because of the geometric shape of the device and which improves the conduction of heated fluids through coils by incorporating insulation means, air relief means, and protective shielding about the device.

Still a further object of the present invention is to provide a novel means for anchoring or mounting a conical solar heating apparatus onto a building structure or ground foundation so that the unit is immobile and constitutes a relatively light weight structure or unit as compared to conventional solar heating devices.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel solar heating device incorporating the present invention;

FIG. 2 is a top plan view of the solar heating device shown in FIG. 1;

FIG. 3 is an enlarged transverse cross-sectional view of the novel heating device shown in FIG. 2 as taken in the direction of arrows 3—3 thereof so as to illustrate the internal component incorporated therein; and FIG. 4 is a cross-sectional view of the tubular coil used in the solar heating device of FIGS. 1-3.

DESCRIPTION OF THE PREFERRED EMBODIMENT

Referring to FIG. 1, the novel solar heating apparatus of the present invention is indicated in the general direction of arrow 10 which includes a solar ray collector assembly comprising a conical or cone-shaped shell indicated in general by numeral 11 which supports a plurality of tubular coils such as indicated by lower coil 12 and upper coil 13. Intermediate coils such as indicated by numerals 14 and 15 are interposed between the outer coils 12 and 13. It is to be understood that the coils are connected together so as to conduct a fluid therethrough from the lowermost coil 12 to the uppermost coil 13. An inlet conduit 16 is connected to the lowermost coil while an outlet conduit 17 conducts the heated fluid away from the unit 10. An air relief valve 18 is operably connected to the uppermost coil 13 so that any undesired pressure may be eliminated from the fluid system.

The solar ray collection assembly comprising the shell 11 and the plurality of tubular coils 12–15 inclusive are covered by a protective shield 20 that is conical or cone-shaped so as to cover the collector assembly in fixed spaced apart relationship. Both the shell 11 and shield 20 are coupled at their outer perimeters to a base indicated by numeral 21. Therefore, it can be seen that the shell 11, plurality of tubular coils 12–15, base 21 and shield 20 are coaxially disposed with respect to one another about a common central axis. The novel solar heating device 10 is mounted on a roof or ground foundation as indicated by numeral 22 by a novel anchoring means comprising tie-down cables outwardly extending from an eyelet fitting 23.

The solar ray collector assembly is intended to receive solar radiation from the sun. The radiation is directed to impinge against the exposed surfaces of the shell 1 and the tubular courses or coils and the heat energy is transferred to the liquid within the coils. Preferably, the shell 11 is composed of aluminum or copper material and the external surface thereof is painted with a black pigmented paint.

Referring now in detail to FIG. 3, it can be seen that the novel solar heating device is anchored to the roof or foundation 22 by means of a cable tie-down system which includes at least three cables 24, 25, 26 and 27 which are arranged normal to each other outwardly radiating from the ring 23 and terminating at their free ends in a anchored connection with the foundation 22. By this means, gusts of wind or other disturbing factors will not dislodge or move the stationary solar heating device from its installed position. It is to be particularly noted that no mounting fixtures or special mounting devices are required to be installed on the roof or ground foundation in order to accommodate assembly of the solar heating device 10. Therefore, the device may readily be installed on a rooftop or at ground level by unskilled persons and no special equipment is required.

Referring now in detail to FIG. 3, it can be seen that the shell 11 includes an exterior surface on which the plurality of tubular coils are mounted. The fluid or water carried in the tubular coils is discharged from the unit after heat transference by conduction through an exit conduit 28 connected to the discharge outlet 17. For purposes of retaining heat, it is preferred that the back side or interior of the shell 11 be covered with an insulative blanket or thickness of insulation material represented by numeral 30. It is to be particularly noted that even the exit conduit and outlet 17 are encased or surrounded as much as is possible by the insulation. Also, it can be seen that the lower end of the conical shield 20 is joined with the lower end of the conical cone or shell 11 by means of the base 21. The base includes a circular portion 31 which terminates at its outer perimeter in an upwardly extending side terminating in an annular flange 32 to which the edge marginal region of the protective shell 20 is attached by suitable fasteners. Insulation 33 is provided between the shell and the flange 32 as well as insulation 34 which extends about the opposite side of the flange 32. The lower edge marginal region of the shell 11 is provided with a foot 35 which is attached to the circular portion 31 of the base by suitable fasteners.

The apex or uppermost end of the shell includes the anchoring means which secures the outer protective shell 20 to the solar ray collector assembly comprising the shell 11 and the tubular coils. In one form, a central rod 36 extends through an opening at the apex of the conical protective shield 20 and through a hole in the apex of the conical shell 11. The rod 36 passes through a coupling tube 37 which rests on top of the shell 11 by means of a circular frustro-conical flange 38 while a similar type flange bears against the underside of the shield 20 and is represented by the numeral 40. A conical fixture 41 is provide immediately below the anchor ring 23 which is carried on one end of the rod 36 and bears against the external side of the conical shield 20 at its apex so as to press the upper edge marginal region of the shield between the opposing surfaces of the fixture 41 and the flange 40. Sufficient pressure is applied to retain the apex of the shell and shield in fixed space relationship by means of a strap or backing plate 42 which may be cinched against the inner surface of the shell by a threaded nut arrangement 43. In order to apply sufficient pressure, the opposite ends of the strap or backing plate 42 are provided with a tapered end piece 44 and 45 respectively. Therefore, the upper end of the shell and shield are held together by the cinching down on the anchoring means via the rod 36 and the respective flanges and backing strap 42. The lower end of the shield and the shell are held together by means of the base 21 with its respective portion 31 and flange portion 32.

If desired, the interior of the shell 11 may include a reservoir identified in general by the numeral 46 into which the heated water or liquid may be stored and made available ready for use by the user. The insulation 30 aids in maintaining the elevated temperature of the stored liquid and the input and output to the reservoir may be readily coupled to the output of the plurality of tubular coils.

Referring now in detail to FIG. 4, it can be seen that the tubular coils may be attached to the exterior surface of the shell 11 by a plurality of C-shaped clips such as clip 50 which partially encircles the exterior of a coil, such as coil 15, and wherein the clip is secured to the shell by means of a suitable fastener such as indicated by a rivet or the likes 51. A fillet of epoxy 52 may be placed on opposite sides of the tube for securement purposes and insulative purposes when desired. It is to be particularly noted that the back side of each tube in the coil is flattened as indicated by numeral 53 so that the coil will rest against the external surface of the shell in a maximum surface contact area so transference of heat from the shell to the liquid circulated within the tube.

In view of the foregoing, it can be seen that by providing a conical shape or geometry for the solar heating device, maximum exposure of the collector shell and tubing to the rays of the sun is provided during the travel of the sun across the skies and such a maximum exposure is provided without moving the collector which remains stationary and immobile on its mounting site. Also, improved thermal transference characteristics are provided by means of the flattened backside of the tubular coils and by providing the backing insulation on the interior of the shell. A sealed cavity is defined between the opposing surfaces of the shell and the shield which may be characterized as a heat chamber primarily responsible for heat transference to the coils and the recirculating water flowing therethrough. The protective shield is transparent to ultra violet and infra red rays and is used as a dust collector to prevent the dust from interfering with the transference of heat from the sun rays to the fluid if allowed to build up about the coils and on the shell. The novel anchoring means provides that unskilled labor may be employed for installing or assembling the solar heating device and that installation can take place without the need for special tools. Neither ground disturbances or wind impingement to the unit or device 10 will move it from its assembly site since the tie-down cables 24-27 inclusive are adequate to secure the device at its intended location. No weighted foundation or extraneous mountings or framework attachments are required as the base 21 may readily rest on any flat installation site.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A stationary solar heater for heating a fluid comprising the combination of:
   a conical solar ray collector assembly having a circular base with an upwardly sloping exterior terminating in an apex;
   said assembly including a substantially conical arrangement of coils for carrying the fluid intended to be heated;
   said assembly further includes a conical shell supporting said conical arrangement of coils on an exterior surface thereof;
   a conical protective shield of light permeable material concentrically disposed over said conical solar ray collector assembly having an inner surface opposing said shell exterior surface in fixed spaced apart relationship;
   anchoring means operably coupling said shell to said collector assembly via their coaxial and concentrically disposed apexes and extending outwardly to support said collector assembly and shield in a fixed and non-movable position;
   said anchoring means includes fastener means joining said shield and collector assembly together at their respective apexes and at least three tie-down cables connected at one end to said fastener means and radiating outwardly from the apex;
   said fluid carrying conical coil includes an air relief valve operably coupled into the topmost coil of said arrangement of coils;
   a layer of insulation material carried on the interior surface of said shell embedding a portion of said coil to preserve heat in said fluid carrying coils;
   said conical arrangement of coils consists of a single curved course of tubing continuously wound about itself to provide a continuous conical array of coils coaxially related wherein each coil is spaced apart from adjacent coils in said conical array;
   said single curved course of tubing includes a continuous flat surface immediately adjacent to said shell exterior surface so as to be in heat transference relationship therebetween; and
   said tubing is characterized as having a generally circular cross section with a flat mounting side adjacent to the external surface of said shell for maximum thermal transference to the circulating fluid carried by said coils.

2. The invention as defined in claim 1 wherein:
   said shell is substantially occupied by a fluid storage container operably connected with said coils to collect and store heated fluid.

3. The invention as defined in claim 2 including:
   a circular base supporting said conical solar ray collector assembly and said protective shield.

4. The invention as defined in claim 3 wherein:
   said shell is composed of aluminum and/or copper; and
   said shell exterior surface is covered with a black pigmented coating.

* * * * *